(12) United States Patent
Hopley et al.

(10) Patent No.: US 6,189,852 B1
(45) Date of Patent: Feb. 20, 2001

(54) SEATING SYSTEM

(75) Inventors: Ian Hopley; George Read, both of Manchester (GB)

(73) Assignee: Manchester Metropolitan University, Manchester (GB)

( * ) Notice: Under 35 U.S.C. 154(b), the term of this patent shall be extended for 0 days.

(21) Appl. No.: 09/263,804

(22) Filed: Mar. 8, 1999

Related U.S. Application Data

(63) Continuation of application No. PCT/GB97/02401, filed on Sep. 5, 1997.

(30) Foreign Application Priority Data

Sep. 6, 1996 (GB) .................................................. 9618659

(51) Int. Cl.[7] .................................................. F16M 13/00
(52) U.S. Cl. ........................ 248/430; 248/429; 296/65.13
(58) Field of Search .................................. 248/429, 430, 248/384.47; 414/749; 296/65.13, 65.14; 244/118.1, 118.6

(56) References Cited

U.S. PATENT DOCUMENTS

| 1,188,706 | * | 6/1916 | Wall ................................. 296/65.14 |
| 3,022,976 | * | 2/1962 | Zia ........................................ 248/430 |
| 3,189,313 | * | 6/1965 | Burns et al. ........................ 248/429 |
| 3,702,179 | * | 11/1972 | Radke et al. ........................ 248/430 |
| 4,114,947 | * | 9/1978 | Nelson ................................ 297/344 |
| 4,281,871 | * | 8/1981 | Grittner et al. ................... 296/65.14 |
| 4,771,969 | * | 9/1988 | Dowd ................................ 244/118.6 |
| 4,796,837 | * | 1/1989 | Dowd ................................ 244/122 R |
| 4,856,738 | * | 8/1989 | Martin ................................ 248/430 |
| 4,949,931 | * | 8/1990 | Fujiwara et al. ................... 248/429 |
| 5,039,155 | * | 8/1991 | Suman et al. ...................... 296/65.14 |
| 5,083,726 | * | 1/1992 | Schurr ................................ 244/118.6 |
| 5,104,176 | * | 4/1992 | Mrozowski ......................... 296/65.14 |
| 5,183,313 | * | 2/1993 | Cunningham ...................... 248/429 |
| 5,207,473 | * | 5/1993 | Nawa et al. ........................ 248/430 |
| 5,337,979 | * | 8/1994 | Bales et al. ........................ 244/118.1 |
| 5,871,318 | * | 2/1999 | Dixon et al. ........................ 410/105 |
| 5,921,606 | * | 7/1999 | Moradell et al. .................. 296/65.03 |

FOREIGN PATENT DOCUMENTS

| 2624903 | * | 12/1977 | (DE) .................................... 248/430 |
| 615879 A1 | * | 9/1994 | (EP) ..................................... 248/430 |
| 388339 | * | 2/1933 | (GB) .................................... 248/430 |
| 433044 | * | 2/1935 | (GB) .................................... 248/429 |
| 754290 | * | 8/1956 | (GB) .................................... 248/429 |

\* cited by examiner

*Primary Examiner*—Anita M. King
*Assistant Examiner*—Naschica C. Sanders
(74) *Attorney, Agent, or Firm*—Nixon & Vanderhye

(57) ABSTRACT

This invention relates to methods of fastening seating to the floor of vehicles, and in particular to systems for allowing the seating to slide for adjustment or removal. Accordingly, a seating system is provided in which the longitudinal configuration and spacing of the seats may be more easily altered, without compromising safety. There is provided a seat anchorage system for seating carried in a vehicle including a track adapted to be attached to the load area of a vehicle, a traveller member configured to inter-engage with the track for longitudinal movement therealong and fixable to a seat, and securing means operative to permit securing of a seat associated with said traveller member in a desired position so as to prevent longitudinal movement of the seat. The traveller member is provided with longitudinally aligned bearings operative between the track and traveller member, the arrangement being such that the bearings maintain the traveller member aligned to facilitate longitudinal motion along said track.

13 Claims, 3 Drawing Sheets

SEATING SYSTEM

This Appln is a cont of PCT/GB97/02401 filed Sep. 5, 1997.

BACKGROUND OF THE INVENTION

This invention relates to methods of fastening seating to the floor of vehicles, and in particular to systems for allowing the seating to slide for adjustment or removal.

Seats in minibuses may be fastened to the floor of a vehicle by many methods. The most common method is simply to bolt the seats directly to the floor of the vehicle. However, in many vehicles, this is not a sufficiently strong method to retain the seat in place in the event of an accident. Furthermore, in order to give vehicles increased flexibility in their load carrying configuration or capability, it may be desirable for the seats to be movable. It is then possible to adjust the spacing between seats, or to remove seats in order to allow more space for cargo such as luggage. Unless a different method of seat anchorage is used, new holes have to be drilled for the new seat positions. process.

Known automobile seats are adjustable for legroom by means of sliding mechanisms which permit the seat body to be moved longitudinally with respect to anchorage points for the seat. Only a limited amount of motion is possible.

In order to allow a greater degree of seat position variation, and in certain circumstances removal of seats, there has been tried a method which involves engaging seats with recessed channels in a vehicle so that the seats may be slid along the tracks and then fixed in position in the configuration desired by tightening of the bolts. Typically attachment is by means of bolts which act between ends of the seat legs and the channel. The bolts must each be loosened when it is desired to move the seats. This is a very fiddly and time consuming process, especially since the seats have a tendency to jam if they become even slightly skewed with respect to the channels as they are slid forward. Attempts to facilitate sliding forwards of the seats have foundered because of safety concerns arising from possible concertinaing of seats during a collision of the vehicle carrying the seats.

SUMMARY OF THE INVENTION

Accordingly it is an object of the present invention to provide a seating system in which the longitudinal configuration and spacing of the seats may more easily altered, without compromising safety.

According to the present invention there is provided a seat anchorage system for seating carried in a vehicle, which system comprises:

track means adapted to be attached to the load area of a vehicle and configured to define an elongate longitudinally running recess, a traveller member comprising an elongate truck received in the recess for longitudinal movement therealong and attached at a front region thereof to a front support means of a seat and at a rear end thereof to a rear support means of the seat, securing means for securing said traveller member in a desired position to prevent longitudinal movement of a seat attached to the traveller member relative to the track means, longitudinally aligned bearing means for the truck, said bearing means being received in the recess and operative between the recess and the truck to maintain the truck aligned in the recess to facilitate longitudinal motion of the truck and a seat fixed thereto along the track means, the truck being at least as floor level spacing between front and rear support means of the seat and being provided with an elongate track means cooperating member extending along substantially the whole length of the truck, the track means being configured to provide an elongate longitudinal truck cooperating element for preventing the truck from lifting out of the recess, the arrangement being such that in the event of sudden acceleration or deceleration of the vehicle, any longitudinal tipping of the seat forwards or backwards causes an upper surface portion of the track means cooperating member of the truck to be urged against an adjacent underside portion of said truck cooperating element, thereby forming an intimate contact which serves substantially to prevent unwanted longitudinal movement of the traveller member along the track means during a crash.

Because the traveller members are provided with longitudinally aligned bearing means, there is no tendency for the traveller members to jam as they are moved along the track means. The traveller means is preferably longer than it is wide.

During extreme loading, such as a frontal collision where tipping of the seats tends to occur, one end of the traveller member will tend to lift and/or to be urged against the elongate track means feature. This means that the collision loading actually enhances the frictional contact between the traveller member and the track means and help prevent unwanted longitudinal motion of the seats during an accident. Indeed it has been found that the track means itself will distort rather than permit forwards motion of the seat under extreme loading, the distortion jamming the traveller member substantially in its original position on the track means. one or more elongate flanges provided on the traveller member. In a preferred embodiment there are two side flanges, one on each side of the traveller member, and the upper surface portion comprises an upper portion of each side flange.

The truck may be enclosed in said recess. The truck may be adapted to be attached to a seat through a narrow longitudinal slot formed in a top wall of the recess. In this way the lip portions of the recess, adjacent the slot, constitute the elongate feature which prevents lifting of the traveller member.

The truck comprises an elongate member adapted to be attached at front region thereof to a front support means of a seat and at a rear end thereof to a rear support means of the seat. In this way a single truck may be used to attach one side of a seat to the vehicle floor. During an accident one end of the truck will tend to rise, pivoting about the other end of the truck which tends to dive. In this way the truck is effectively wedged in place and prevented from moving during extreme loading. The front and rear support means typically comprise front and rear seat legs, but could together comprise a single rigid sheet member or framework. Preferably the length of the truck is at least as long as the floor level spacing between front and rear legs of a seat.

The truck may be provided with first wheel means adapted to support the truck on a lower wall of the recess and facilitate longitudinal movement in the recess when the securing means is released. The first wheel means may comprise a plurality of rollers, each roller rotatably attached to the truck. The rollers may be positioned at front and rear end regions of the truck. The said wheel means may comprise cylindrical rollers, wheels or other roller bearings. In one embodiment there are four generally hemi-spherical or frusto-conical rollers, two of which are disposed at a front region of the truck, and two of which are disposed at a rear region of the truck. Each roller in each pair is preferably laterally spaced one from the other.

The longitudinally aligned bearing means may comprise laterally facing edge portions of the rollers, which edge portions each face either sidewall of the recess.

Alternatively the longitudinally aligned bearing means may comprise second wheel means carried on said truck for rotation about a vertical axis, thereby to prevent jamming of the truck against side walls of the recess as the seats are moved. The second wheel means may comprise a pair of wheels, one rotatably mounted at a front end of the truck, and the other rotatably mounted at a rear end of the truck.

The securing means may be included in, or carried by, the traveller member, or may be separate therefrom and, for example carried by the seat. Preferably the securing means may comprise one or more spring-loaded plungers associated with each truck and adapted to engage an array of longitudinally spaced features in each track means. The remote release means may be provided for the plungers, which remote release means is adapted to be operable by a single action for all seats on a track means en masse. Release may be effected by vertical motion of a plunger which can engage said features.

A complete seating system may comprise a system as hereinbefore described wherein there is at least one pair of parallely aligned track means, a plurality of seats including left side support means and right side support means, and a traveller member attached to each support means of each seat, one of which traveller members is inter-engaged with a left track means and the other inter-engaged with a right track means.

According to another aspect of the invention there is provided a method of converting a vehicle having a substantial load area for the carrying of passenger cargo comprising installing a system as claimed in any preceding claim in the load area.

"Seat" as used herein means any support for occupants in a vehicle. This includes individual seats, or bench seats for more than one person. The seating is preferably provided with restraining means for the occupants in the form of seat belts or the like. The seat belts may form an integral part of the seat or may be secured at least in part direct to the vehicle body.

Track means may extend longitudinally over substantially the whole length of the load area, and at least where seating is to be disposed in the load area. In this way considerable freedom is given in the disposition of the seating.

In another aspect of the invention the track means are mounted on a sub-frame juxtaposed the vehicle floor, which sub-frame may comprise an orthogonal array of longitudinal and lateral members. Such a sub-frame is described in our British Patent Specification No. 2 291 628 the disclosure of which is incorporated herein.

The sub-frame provides a strong mounting for the tracks, which are preferably mounted on each of the longitudinal members thereby further increasing the strength of the assembly and providing greater protection to passengers in such a seating arrangement in the event of an accident. Furthermore, the sub-frame aids the longitudinal and parallel alignment of the track means so that jamming is less likely to arise from missalignments. The track means may be attached to corresponding longitudinal members in the sub-frame. This ensures that the track means have suitable support against loading from the seating and passengers, and provides a long contact length between track means and sub-frame in which to provide secure attachment of the track means.

The sub-frame also stiffens the structure of the vehicle floor to help prevent warping, which warping may cause jamming of traveller members on the track means.

The sub-frame may be bolted to the floor of the vehicle, so that it may be removed from time to time, or may be permanently fitted, by for example, welding.

The sub-frame preferably extends over the entire load area of the vehicle where passenger seating is to be disposed. The seating in the vehicle cab may also be arranged on the sub-frame, but it is intended that such seating will already have been provided by the vehicle manufacturer where seating conversion of, for example, a panel van is to be carried out.

A false floor may be provided above the sub-frame. Preferably the false floor occupies the an area between tracks on the floor. In this case the tracks are preferably provided with a longitudinally extending side flange on each sidewall thereof, the flanges being adapted to cover the juxtaposed edge portions of the flooring and the edges of the sidewalls of the tracks.

BRIEF DESCRIPTION OF THE DRAWINGS

Following is a description by way of example only and with reference to the drawings of one method of putting the invention into effect.

In the drawings.

DETAILED DESCRIPTION OF THE INVENTION

Figure 1:
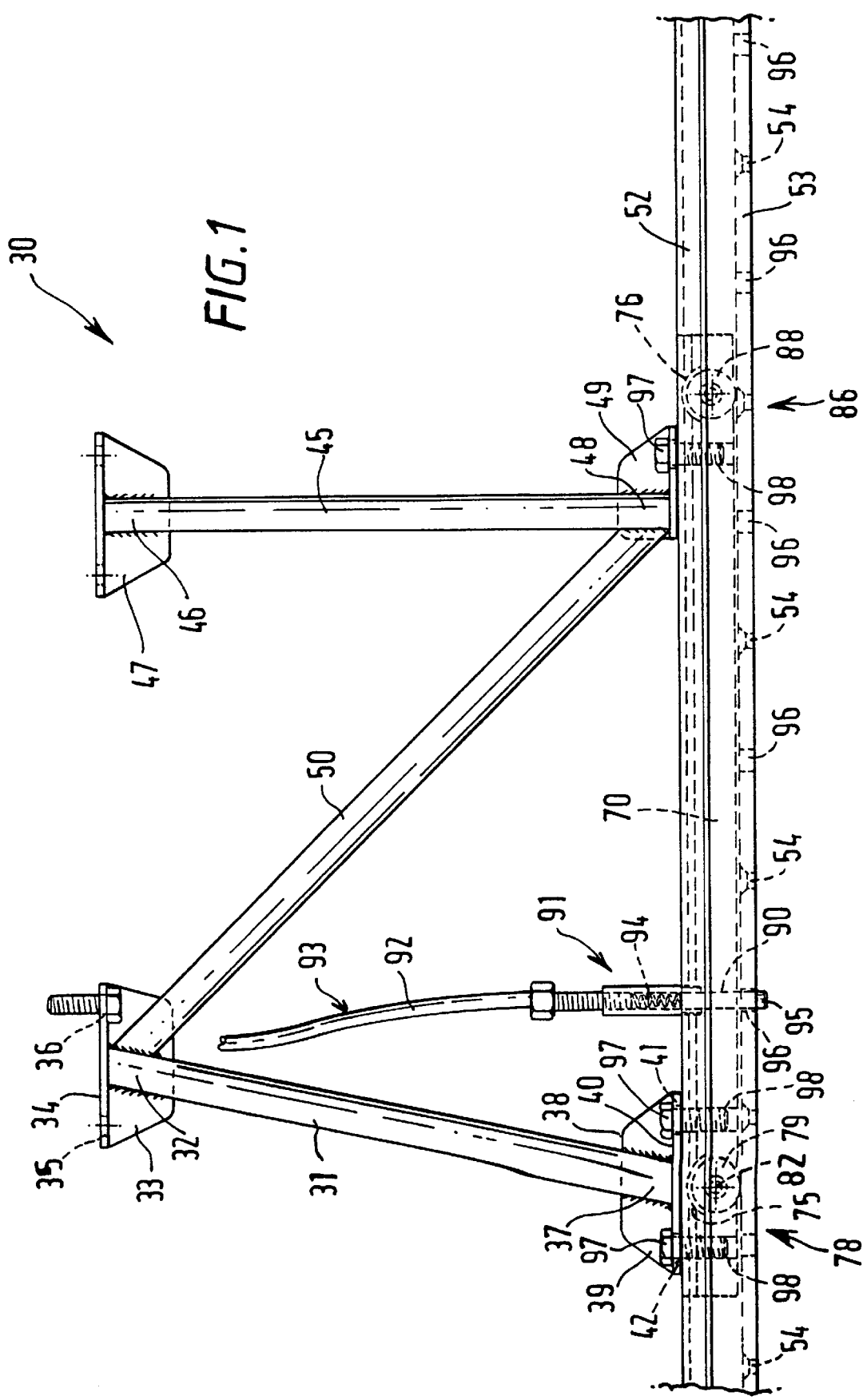
FIG. 1 is side view of a seat leg arrangement attached to a truck accommodated in a track means, which truck and track means are an embodiment of one aspect of the present invention.

In FIG. 1 a seat leg arrangement for one side of a vehicle seat is shown at 30. The arrangement comprises a front leg 31 which is substantially vertical, but sloping slightly rearwardly. A top end of the leg 32 is attached by welding to a depending portion of a bracket 33. The bracket has a flat upper portion 34 which is provided with front and rear spaced apart holes 35 and 36. These holes permit attachment of the front leg of the seat to a seat frame (not shown). A bottom end 37 of the front leg is welded to a truck bracket 38. The Bracket has an L-section and an upstanding flange portion 39 is welded to the lower end region of the seat leg. A horizontal flange portion 40 of the bracket is welded to the bottom end of the leg. The horizontal flange portion is provided with front and rear spaced apart holes 41 and 42.

A rear leg 45 stands vertical and is spaced apart from the front leg. As with the front leg, a top end 46 of the rear leg is welded to a bracket 47 which permits connection of the leg to the seat frame (not shown). Similarly, a bottom end 48 of the rear leg is attached to a lower L-section truck bracket 49. A strut 50 extends diagonally between a top end portion 32 of the front leg and a bottom end portion 48 of the rear leg. Attachment between the strut and each leg is by welding.

Figure 2:
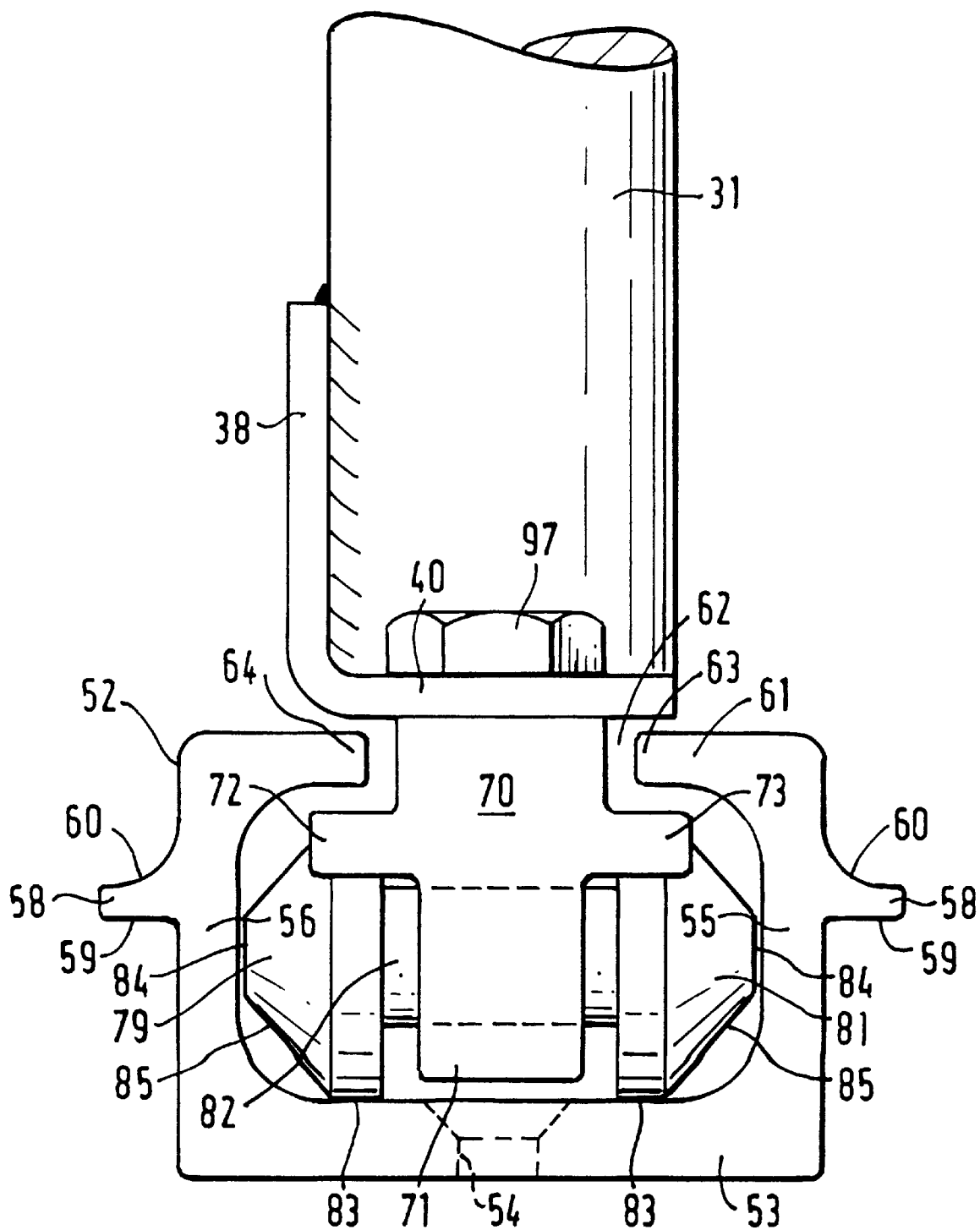
FIG. 2 is an end on view of the embodiment shown in FIG. 1.

A generally square section elongate track 52 is shown in FIG. 1 and end-on in FIG. 2. The track has a horizontal bottom wall 53 which is provided with a plurality of spaced apart counter sunk holes 54. The holes 54 permit attachment of the track to a vehicle sub-frame shown in FIG. 3. Sidewalls 55 and 56 of the track are upstanding from the bottom wall 53. An outside portion of each side wall is formed with an elongate flange 58. Each flange has a horizontal lower face 59 and a sloping upper face 60. An upper wall 61 of the track is formed with an elongate slot 62 which is centrally aligned and extends longitudinally of the track. Either side of the slot, are two lip portions 63 and 64.

A truck 70 is shown accommodated inside the track in FIG. 1 and end on in FIG. 2. The truck is an elongate solid member. The truck is formed with a rectangular section lower portion 71. The lower portion steps laterally outwards to define two side flanges 72 and 73 which extend along the whole length of the truck, save for cut out portions 75, 76 corresponding to the position of wheels described hereafter. Above the side flanges the truck narrows again to form an upper portion which enters into the slot in the track, and fits therein with a small clearance. A front end region 78 of the truck is provided with a pair of wheels 79,81 which are laterally spaced apart from each other on either side of the truck. The wheels are mounted for rotation on an axle 82. An inside portion of each wheel is configured to provide a cylindrical bearing surface 83 which allows the truck to be moved in the track. An outside portion 84 of the wheel is formed in the shape of a frusto-cone or hemisphere to provide a lateral bearing surface 85. The bearing surface is adjacent the track side walls and contact thereagainst in the event of any incipient skewing of the truck during travel. A rear end region 86 of the truck is also provided with a pair of wheels 88 configured in the same way as those for the front of the truck.

The truck is provided just aft of the front leg position with a vertical bore 90 shown in FIG. 1. The bore carries thereabove a spring plunger mechanism 91. The plunger mechanism includes a flexible cable 92 located inside a sheath 93. A spring 94 is located above a plunger 95 carried in the bore. The spring biases the plunger downwards against the tracking. In a locked position the plunger is entered into one of a plurality of plunger holes 96 formed in the bottom wall of the track. Operation of the plunger mechanism causes the plunger to lift upwards in the bore away from the track plunger hole and permit longitudinal movement of the track.

The lower brackets of each seat leg are attached by means of self-tapping bolts 97 which are entered into corresponding threaded bores 98 in the front and rear end regions of the truck after passing through the front and rear holes in the lower brackets. In this way a rigid connection is formed between the truck and the seat frame.

Figure 3:
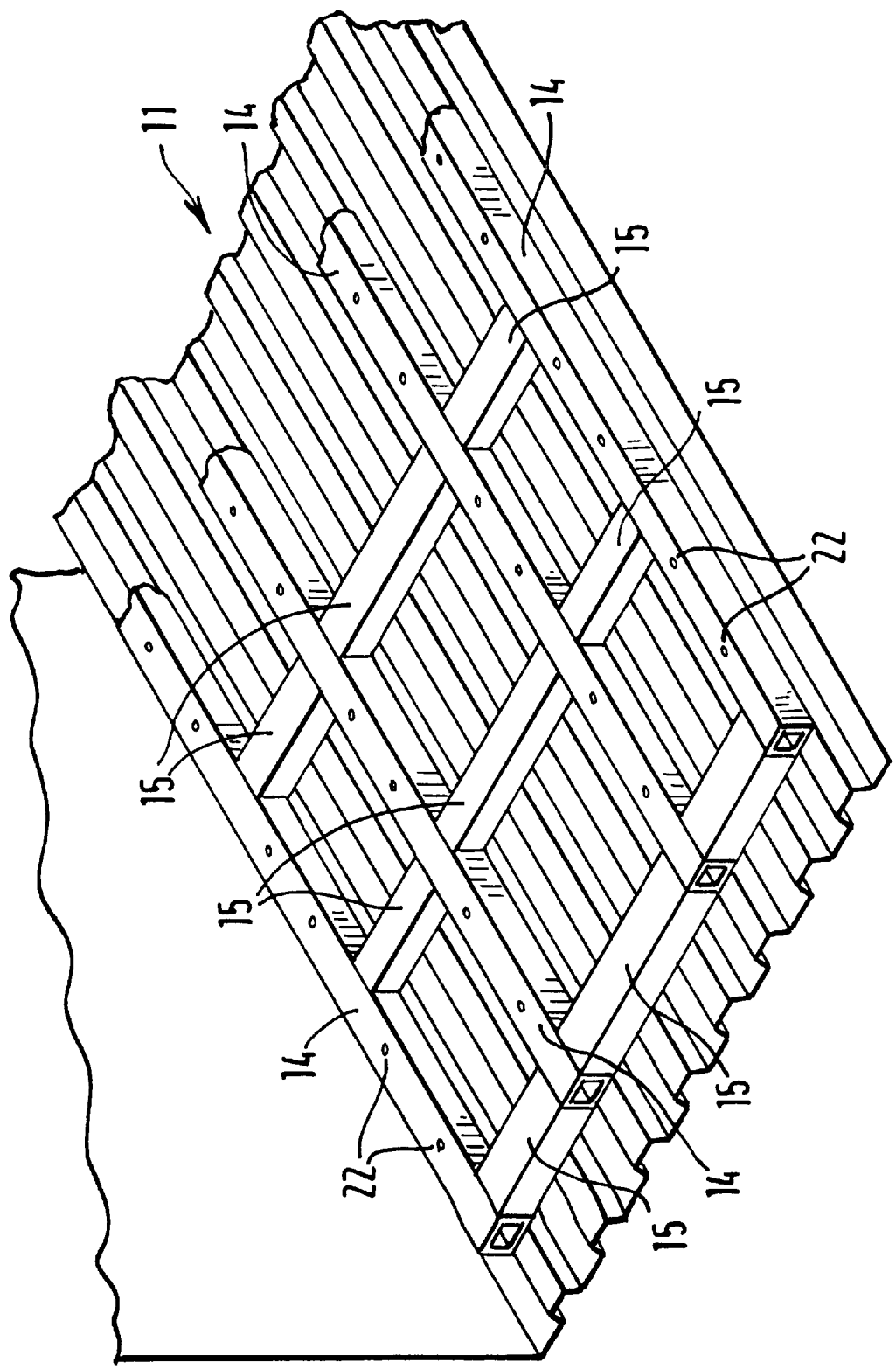
FIG. 3 is a perspective view of a sub-frame according to one aspect of the present invention, mounted on the floor of a vehicle.

The track is attached to sub-frame comprising an orthogonal lattice of longitudinal 14 and lateral 15 members. The sub-frame is connected to a corrugated vehicle floor 11 as shown in FIG. 3. The track is arranged to overlay the longitudinal members 14 of the sub-frame and is attached to the sub-frame by means of bolts which are entered into the countersunk holes in the track and then screwed down into holes 22 in the longitudinal members. A false floor (not shown) is provided above the sub-frame, and configured to abut the underside faces 59 of the side flanges of the track.

In practice, a plurality of tracks are laid down in parallel pairs over the load area of a vehicle. Each pair of tracks is associated with a line of seats which are to be move along the tracks. The trucks are entered into the tracks with the seats attached, and moved forwards to their chosen positions, whereupon the respective plunger mechanisms are released to cause the plungers to descend and lock the trucks in place. The trucks are thereby rendered immobile, until the plungers are raised. There are two trucks for each seat, each truck corresponding to one side of each seat.

In the event of the vehicle being involved in an accident such a fontal collision or a rear shunt, the deceleration or acceleration acting on the vehicle will cause the seats to tend to tip forwards (in a head-on collision) or rearwards (in a rear shunt). In these cases the side flanges 72,73 on the truck will be lifted to abut the underside of the corresponding track upper wall lip portions 63,64 and effectively jam the truck against longitudinal movement, even in the event of plunger failure (for example by shearing). In a frontal collision the front region of the truck will tend to dive against the lower wall of the track, while the rear region of the truck will rise, pivoting about the front, and press very strongly against the lip portions of the track. Any deformation of the lip portions will serve further to prevent any tendency for forwards motion of the truck, so the system is highly stable and fails progressively in a collision.

The provision of linear bearings (the wheels) maintains minimises friction and permits easy movement of the seats, with no tendency for the development of misalignments which can cause jamming. Thus the seats may be moved with the minimum of effort.

What is claimed is:
1. A seating system for a vehicle, comprising:
   (i) a track adapted to be attached to a load area of a vehicle and defining an elongate longitudinally extending recess,
   (ii) a traveller member comprising an elongate truck received in the recess for longitudinal movement therealong and attached at a front region thereof to a front support of a seat and at a rear region thereof to a rear support of the seat,
   (iii) securing means for securing said traveller member in a desired position to prevent longitudinal movement of the seat attached to the traveller member relative to said track,
   (iv) longitudinally aligned bearings for the truck received in the recess and operative between the track and the truck to maintain said truck aligned in the recess to facilitate longitudinal motion of the truck and the seat fixed thereto along said track, said truck being at least as long as floor level spacing between said front and rear supports of the seat and being provided with an elongate track cooperating member comprising one or more elongate flanges provided on the truck and extending along substantially the whole length of the truck, said track being configured to provide an elongate longitudinal truck cooperating element for preventing the truck from lifting out of the recess, the arrangement being such that in the event of sudden acceleration or deceleration of the vehicle, any longitudinal tipping of the seat forwards or backwards causes an upper surface portion of the elongate flanges of the truck to be urged against an adjacent underside portion of said truck cooperating element of said track, thereby forming an intimate contact therewith serving substantially to prevent unwanted longitudinal movement of the traveller member along the track during a crash.

2. A system as claimed in claim 1 wherein said track cooperating member comprises two elongate flanges, one on each side of the truck, and the upper surface portion comprises an upper surface portion of each side flange.

3. A system as claimed in claim 2 wherein the front and rear seat supports comprise respective front and rear seat legs.

4. A seating system for a vehicle, comprising:
   (i) a track adapted to be attached to a load area of a vehicle and defining an elongate longitudinally extending recess, said track having a narrow slot formed in a top wall thereof opening into said recess, said top wall comprising lip portions on either side of said narrow slot,
   (ii) a traveller member comprising an elongate truck received in the recess for longitudinal movement therealong and attached at a front region thereof to a front support of a seat and at a rear region thereof to a rear support of the seat through the narrow slot,
   (iii) securing means for securing said traveller member in a desired position to prevent longitudinal movement of the seat attached to the traveller member relative to said track,
   (iv) longitudinally aligned bearings for the truck received in the recess and operative between the track and the truck to maintain said truck aligned in the recess to facilitate longitudinal motion of the truck and the seat fixed thereto along said track,
said truck being at least as long as floor level spacing between said front and rear supports of the seat and being provided with an elongate track cooperating member extending along substantially the whole length of the truck, said lip portions of the track being configured to prevent the truck from lifting out of the recess, the arrangement being such that in the event of sudden acceleration or deceleration of the vehicle, any longitudinal tipping of the seat forwards or backwards causes an upper surface portion of the track cooperating member of the truck to be urged against an adjacent underside portion of said lip portions of said track, thereby forming an intimate contact therewith serving substantially to prevent unwanted longitudinal movement of the traveller member along the track during a crash.

5. A seating system for a vehicle, comprising:
   (i) a track adapted to be attached to a load area of a vehicle and defining an elongate longitudinally extending recess,
   (ii) a traveller member comprising an elongate truck received in the recess for longitudinal movement therealong and attached at a front region thereof to a front support of a seat and at a rear region thereof to a rear support of the seat,
   (iii) securing means for securing said traveller member in a desired position to prevent longitudinal movement of the seat attached to the traveller member relative to said track,
   (iv) longitudinally aligned bearings for the truck received in the recess and operative between the track and the truck to maintain said truck aligned in the recess to facilitate longitudinal motion of the truck and the seat fixed thereto along said track,
   (v) said truck having horizontal axis wheel means for supporting the truck on a lower inside wall of the track and facilitating longitudinal movement of the truck in the recess upon release of the securing means,
said truck being at least as long as floor level spacing between said front and rear supports of the seat and being provided with an elongate track cooperating member extending along substantially the whole length of the truck, said truck being configured to provide an elongate longitudinal truck cooperating element for preventing the truck from lifting out of the recess, the arrangement being such that in the event of sudden acceleration or deceleration of the vehicle, any longitudinal tipping of the seat forwards or backwards causes an upper surface portion of the track cooperating member of the truck to be urged against an adjacent underside portion of said truck cooperating element of said track, thereby forming an intimate contact therewith serving substantially to prevent unwanted longitudinal movement of the traveller member along the track during a crash.

6. A system as claimed in claim 5 wherein the horizontal axis wheel means comprises a plurality of rollers, each roller being rotatably attached to the truck.

7. A system as claimed in claim 6 wherein the rollers are positioned at front and rear end regions of the truck.

8. A system as claimed in claim 6 wherein the bearings comprise laterally facing edge portions of the rollers, said edge portions each facing a sidewall of the track and together serving to prevent skewing of the truck in the recess.

9. A system as claimed in claim 6 wherein the longitudinally aligned bearings comprise vertical axis wheel means carried on said truck facing side walls of the track, thereby to prevent jamming of the truck against side walls as the seats are moved.

10. A system as claimed in claim 9 wherein the vertical axis wheel means comprise a pair of wheels, one rotatably mounted at a front end of the truck, and the other rotatably mounted at a rear end of the truck.

11. A seating system for a vehicle, comprising;
   (i) a track adapted to be attached to a load area of a vehicle and defining an elongate longitudinally extending recess,
   (ii) a plurality of traveller members each comprising an elongate truck received in the recess for longitudinal movement therealong and attached at a front region thereof to a front support of a seat and at a rear end thereof to a rear support of the same seat,
   (iii) securing means for securing said traveller member in a desired position to prevent longitudinal movement of the seat attached to the traveller member relative to said track, said securing means comprising at least one spring-loaded plunger associated with each truck and adapted to engage one of an array of longitudinally spaced stops in said track, each plunger being provided with a remote release operable by a single action for all the seats on a track en masse,
   (iv) longitudinally aligned bearings for each truck received in the recess and operative between the track and the truck to maintain said truck aligned in the recess to facilitate longitudinal motion of the truck and the seat fixed thereto along said track,
said truck being at least as long as floor level spacing between said front and rear supports of the seat and being provided with an elongate track cooperating member extending along substantially the whole length of the truck, said track being configured to provide an elongate longitudinal truck cooperating element for preventing the trucks from lifting out of the recess, the arrangement being such that in the event of sudden acceleration or deceleration of the vehicle, any longitudinal tipping of the seat forwards or backwards causes an upper surface portion of the track cooperating member of each truck to be urged against an adjacent underside portion of said truck cooperating element of said track, thereby forming an intimate contact therewith serving substantially to prevent unwanted longitudinal movement of the traveller members along the track during a crash.

12. A seating system for a vehicle, comprising;
(i) a plurality of parallel aligned tracks, each track being adapted to be attached to a load area of a vehicle and defining an elongate longitudinally extending recess,
(ii) a plurality of seats each including a left side pair of legs and a right side pair of legs, each pair of legs being attached to an elongate truck of a traveller member, the front leg being attached at a front region of the truck and the rear leg being attached at a rear region of the truck, and one of said trucks being accommodated in the recess of one of said tracks and another of said trucks being accommodated in the recess of another of said tracks,
(iii) securing means for securing each traveller member in a desired position to prevent longitudinal movement of the seat attached to the traveller member relative to said track,
(iv) longitudinally aligned bearings for each truck received in the recess and operative between the track and the truck to maintain said truck aligned in the recess to facilitate longitudinal motion of the truck and the seat fixed thereto along said track,
said truck being at least as long as floor level spacing between said front and rear legs of the seat and being provided with an elongate track cooperating member extending along substantially the whole length of the truck, said track being configured to provide an elongate longitudinal truck cooperating element for preventing the trucks from lifting out of the recess, the arrangement being such that in the event of sudden acceleration or deceleration of the vehicle, any longitudinal tipping of the seat forwards or backwards causes an upper surface portion of the track cooperating member of each truck to be urged against an adjacent underside portion of said truck cooperating element of said track, thereby forming an intimate contact therewith serving substantially to prevent unwanted longitudinal movement of the traveller members along the track during a crash.

13. In a seating system for a vehicle comprising at least a pair of tracks adapted to be attached to a substantial load area of a vehicle and defining an elongate longitudinal extending recess, a traveller member comprising an elongate truck accommodated in each recess for longitudinal movement therealong and attached at a front region thereof to a front support of a seat and at a rear region thereof to a rear support of the seat, securing means for securing each traveller member in a desired position to prevent longitudinal movement of a seat attached to the traveller member relative to the track, longitudinally aligned bearings for each truck, each said bearings being received in the recess and operative between the track and truck to maintain said truck aligned in the recess to facilitate longitudinal motion of the truck and a seat fixed thereto along the track, said truck being at least as long as floor level spacing between front and rear support means of the seat and being provided with an elongated track cooperating member extending along substantially the whole length of the truck, said track being configured to provide an elongate longitudinal truck cooperating element for preventing the truck from lifting out of the recess, the arrangement being such, that in the event of sudden acceleration or deceleration of the vehicle, any longitudinal tipping of the seat forwards or backwards causes an upper surface portion of the track cooperating member of the truck to be urged against an adjacent underside portion of the truck cooperating element, thereby forming an intimate contact therewith serving substantially to prevent unwanted longitudinal movement of the traveller member along the track during a crash, a plurality of seats each including a pair of legs and a truck attached to each pair of legs, one truck being received in one of said tracks and the other truck being received in another of said tracks, a method of converting a vehicle having the substantial load area for the carrying of passenger cargo comprising attaching the tracks of said seating system in the load area either directly to the vehicle floor or to a sub-frame located on the vehicle floor.

* * * * *